US012681656B1

(12) United States Patent
Mayo et al.

(10) Patent No.: US 12,681,656 B1
(45) Date of Patent: Jul. 14, 2026

(54) DATA VALIDATION OF CONTAINER OBJECTS IN A DEDUPLICATION STORAGE SYSTEM

(71) Applicant: Hewlett Packard Enterprise Development LP, Spring, TX (US)

(72) Inventors: Richard Phillip Mayo, Bristol (GB); Peter Thomas Camble, Bristol (GB); Callum Murray, Bristol (GB)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 19/061,043

(22) Filed: Feb. 24, 2025

(51) Int. Cl.
G06F 3/06 (2006.01)
G06F 11/1446 (2026.01)

(52) U.S. Cl.
CPC .......... G06F 3/0641 (2013.01); G06F 3/0604 (2013.01); G06F 3/0608 (2013.01); G06F 3/0679 (2013.01); G06F 11/1453 (2013.01)

(58) Field of Classification Search
None
See application file for complete search history.

(56) References Cited

U.S. PATENT DOCUMENTS

| 8,954,398 B1 * | 2/2015 | Zhang ................. | G06F 16/1748 |
| | | | 707/687 |
| 10,019,323 B1 * | 7/2018 | Bai ..................... | G06F 11/1004 |
| 10,489,240 B2 * | 11/2019 | Rat ................... | H03M 13/2906 |
| 2013/0046944 A1 * | 2/2013 | Domyo .............. | G06F 11/1453 |
| | | | 711/E12.103 |
| 2018/0089037 A1 * | 3/2018 | Liu ..................... | G06F 11/1448 |
| 2020/0293213 A1 * | 9/2020 | Haridas ................. | G06F 3/067 |
| 2023/0259488 A1 * | 8/2023 | Mayo ................... | G06F 16/125 |
| | | | 707/694 |

* cited by examiner

*Primary Examiner* — Kaushikkumar M Patel
(74) *Attorney, Agent, or Firm* — Trop, Pruner & Hu, P.C.

(57) ABSTRACT

Example implementations relate to operations in a storage system. An example includes receiving a data unit to be stored in a persistent storage of a deduplication storage system, and identifying a container index that includes metadata regarding the data unit. The example also includes identifying a first container entity group (CEG) object that is recorded, in the container index, as a deduplicated storage location of the data unit. The example also includes, in response to a determination that that a validation state of the first CEG object is recorded as invalid in the container index, storing the data unit in a second CEG object. The example also includes modifying the container index to record the second CEG object as the deduplicated storage location of the data unit.

20 Claims, 11 Drawing Sheets

Increment Ref. Count

| Container Index 430 | | | | | |
|---|---|---|---|---|---|
| ID | Fingerprint | Ref. Count | CEG | Offset | CEG State |
| D1 | FG1 | 5 | CEG-A | 1 | Invalid |
| D2 | FG2 | 6 | CEG-B | 1 | Valid |
| D6 | FG6 | 4 | CEG-C | 1 | Valid |

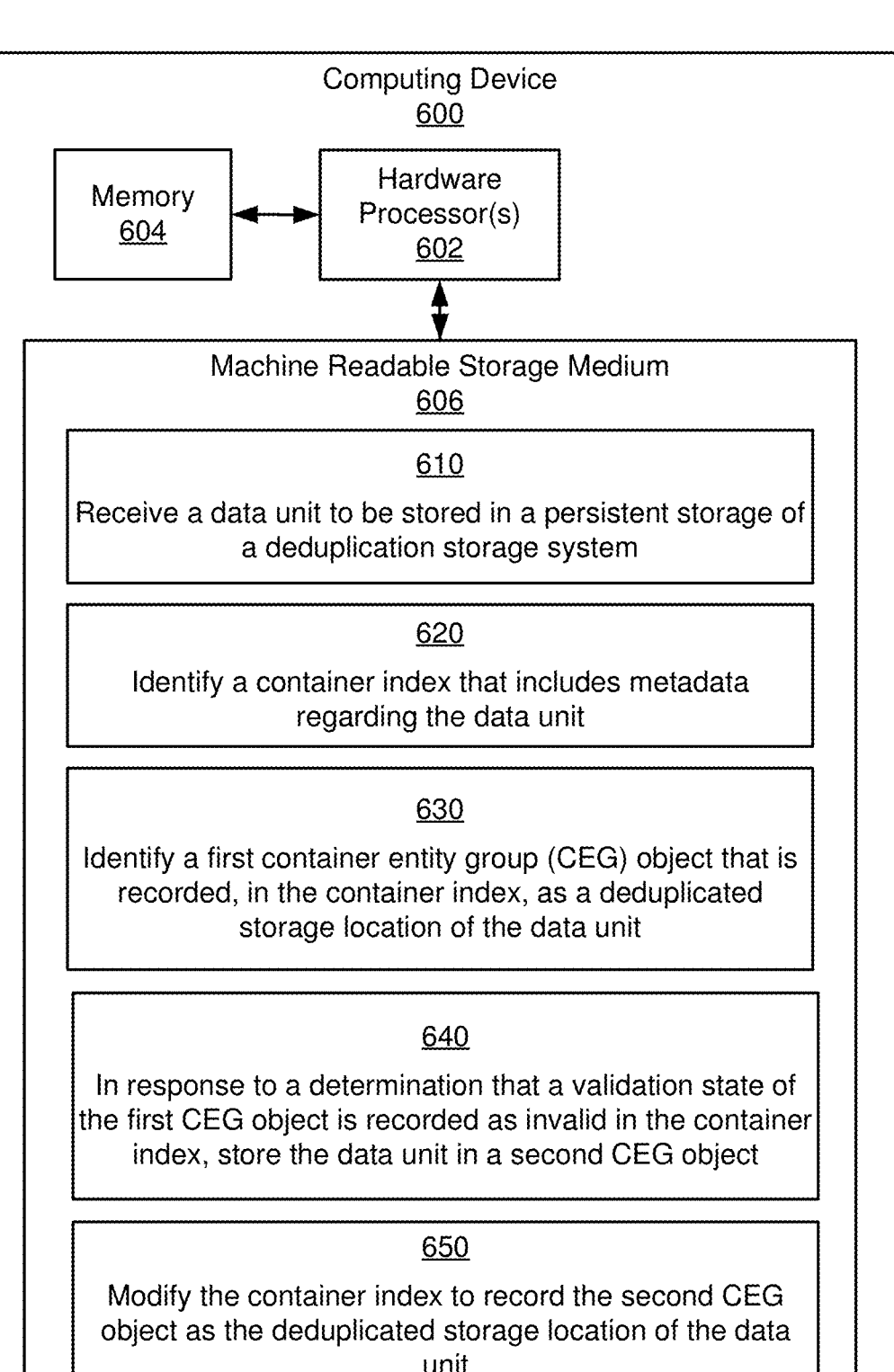

Computing Device
600

Memory
604

Hardware
Processor(s)
602

Machine Readable Storage Medium
606

610

Receive a data unit to be stored in a persistent storage of a deduplication storage system

620

Identify a container index that includes metadata regarding the data unit

630

Identify a first container entity group (CEG) object that is recorded, in the container index, as a deduplicated storage location of the data unit

640

In response to a determination that a validation state of the first CEG object is recorded as invalid in the container index, store the data unit in a second CEG object

650

Modify the container index to record the second CEG object as the deduplicated storage location of the data unit

FIG. 6

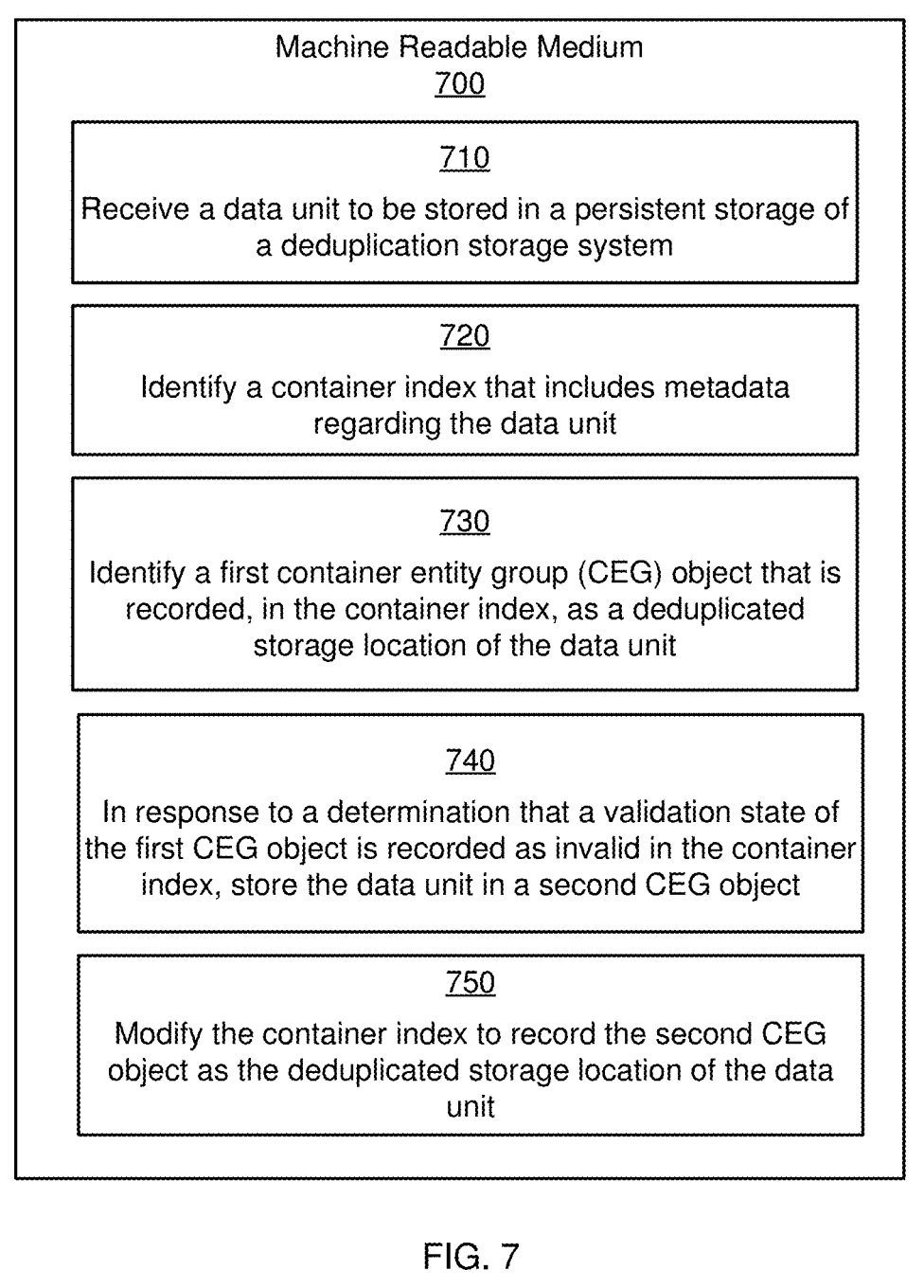

Machine Readable Medium
700

710
Receive a data unit to be stored in a persistent storage of a deduplication storage system 720
Identify a container index that includes metadata regarding the data unit 730
Identify a first container entity group (CEG) object that is recorded, in the container index, as a deduplicated storage location of the data unit 740
In response to a determination that a validation state of the first CEG object is recorded as invalid in the container index, store the data unit in a second CEG object 750
Modify the container index to record the second CEG object as the deduplicated storage location of the data unit

FIG. 7

DATA VALIDATION OF CONTAINER OBJECTS IN A DEDUPLICATION STORAGE SYSTEM

BACKGROUND

Data reduction techniques can be applied to reduce the amount of data stored in a storage system. An example data reduction technique includes data deduplication. Data deduplication identifies data units that are duplicative, and seeks to reduce or eliminate the number of instances of duplicative data units that are stored in the storage system.

BRIEF DESCRIPTION OF THE DRAWINGS

Some implementations are described with respect to the following figures.

FIG. 6 is a schematic diagram of an example computing device, in accordance with some implementations.

FIG. 7 is a diagram of an example machine-readable medium storing instructions in accordance with some implementations.

Figure 1:
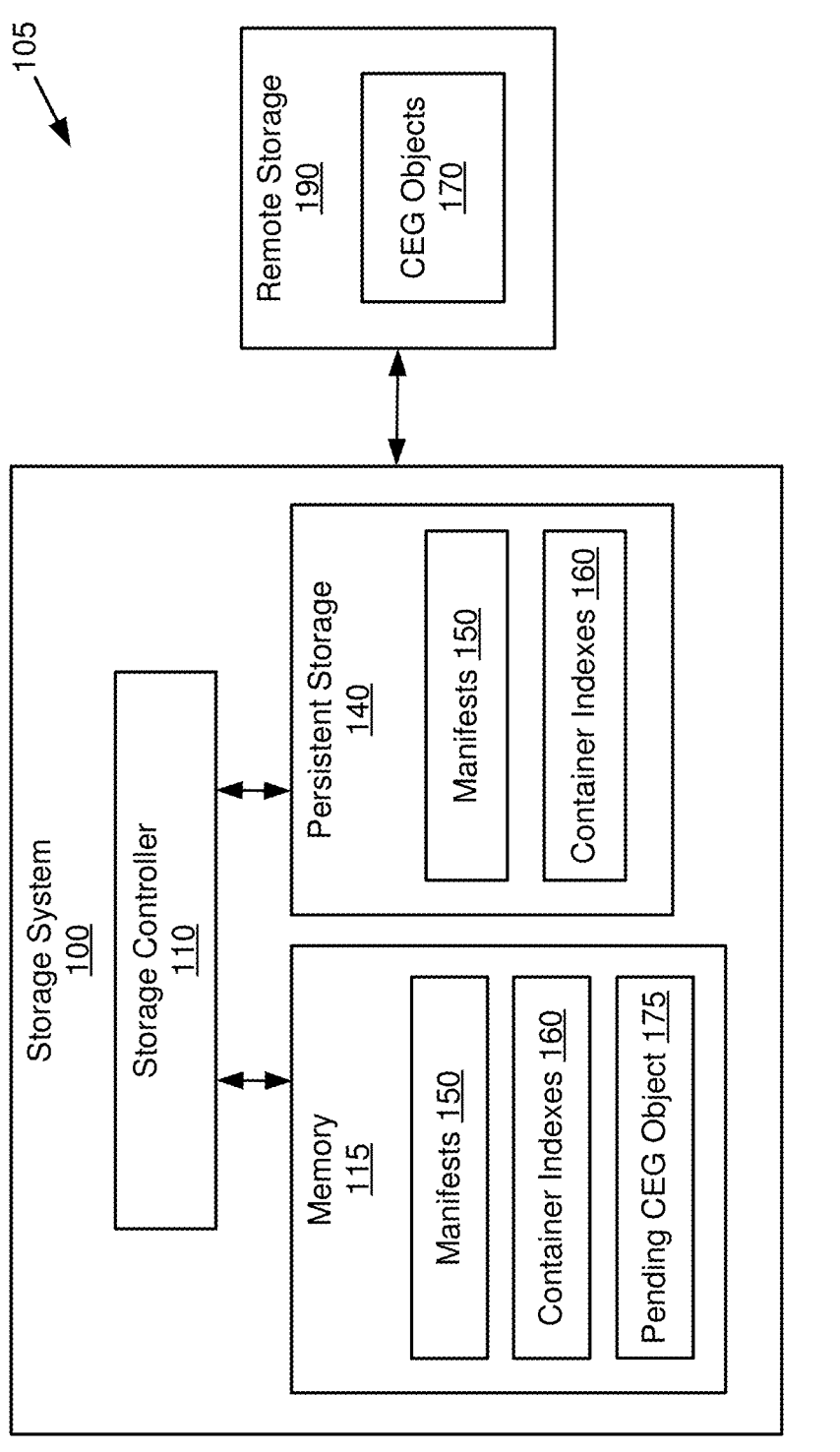
FIG. 1 is an illustration of an example storage system, in accordance with some implementations.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In some examples, a storage system may receive a data stream from an external data source or system, and may store or "backup" a copy of the data stream. For example, the data stream may be generated by a backup system or program during a backup of a collection of data. The data stream may include discrete data units (or "chunks") that are generated by the data source. Additionally (or alternatively), the data stream may include fingerprints that represent the data units, and that are generated by the external data source. As used herein, the term "fingerprint" refers to a value derived by applying a function on the content of the data unit (where the "content" can include the entirety or a subset of the content of the data unit). An example of a function that can be applied includes a hash function that produces a hash value based on the content of an incoming data unit.

Examples of hash functions include cryptographic hash functions such as the Secure Hash Algorithm 2 (SHA-2) hash functions, e.g., SHA-224, SHA-256, SHA-384, etc. In other examples, other types of hash functions or other types of fingerprint functions may be employed.

in some examples, the storage system may backup at least a portion of the data stream in deduplicated form, to thereby reduce the amount of storage space occupied by storage of the data stream. The storage system may create a "backup item" to represent a data stream in a deduplicated form. The storage system may perform a deduplication process including comparing the fingerprints of incoming data units to fingerprints of stored data units, and determining which incoming data units (if any) are duplicates of previously stored data units (e.g., when the comparison indicates matching fingerprints). In the case of data units that are duplicates, the storage system may store references to previously stored data units instead of storing the duplicate incoming data units. A process for receiving and deduplicating an inbound data stream may be referred to herein as a "data ingest" process of a storage system.

A "storage system" can include a storage device or an array of storage devices. A storage system may also include storage controller(s) that manage(s) access of the storage device(s). A "data unit" can refer to any portion of data that can be separately identified in the storage system. In some cases, a data unit can refer to a chunk, a collection of chunks, or any other portion of data. In some examples, a storage system may store data units in persistent storage. Persistent storage can be implemented using one or more of persistent (e.g., nonvolatile) storage device(s), such as disk-based storage device(s) (e.g., hard disk drive(s) (HDDs)), solid state device(s) (SSDs) such as flash storage device(s), or the like, or a combination thereof. A "controller" can refer to a hardware processing circuit, which can include any or some combination of a microprocessor, a core of a multi-core microprocessor, a microcontroller, a programmable integrated circuit, a programmable gate array, a digital signal processor, or another hardware processing circuit. Alternatively, a "controller" can refer to a combination of a hardware processing circuit and machine-readable instructions (software and/or firmware) executable on the hardware processing circuit.

In some examples, a deduplication storage system may use metadata structures for processing inbound data streams (e.g., backup items). For example, such metadata structures may include data recipes (also referred to herein as "manifests") that specify the order in which particular data units are received for each backup item. Further, such metadata may include item metadata to represent each received backup item (e.g., a data stream) in a deduplicated form. The item metadata may include identifiers for a set of manifests, and may indicate the sequential order of the set of manifests. The processing of each backup item may be referred to herein as a "backup process." Subsequently, in response to a read request, the deduplication system may use the item metadata and the set of manifests to determine the received order of data units, and may thereby recreate the original data stream of the backup item. Accordingly, the set of manifests may be a representation of the original backup item.

In some examples, the manifests may include a sequence of records, with each record representing a particular set of data unit(s). The records of the manifest may include one or more fields that identify container indexes that index (e.g., include storage information for) the data units. For example, a container index may include one or more fields that specify fingerprints for the stored data units, location information (e.g., containers, offsets, etc.) for the stored data units, compression and/or encryption characteristics of the stored data units, and so forth. Further, the container index may include reference counts that indicate the number of manifests that reference each data unit.

In some examples, upon receiving a data unit (e.g., in a data stream), it may be matched against one or more container indexes to determine whether an identical data unit is already stored in a container of the storage system. For example, the storage system may compare the fingerprint of the received data unit against the fingerprints in one or more container indexes. As used herein, the term "matching operation" may refer to an operation to compare fingerprints of a collection of multiple data units (e.g., from a particular backup data stream) against fingerprints stored in one or more container indexes. If no matching fingerprints are found in the searched container index(es), the received data unit may be stored in a container entity group ("CEG") object, and a metadata entry for the received data unit may be added to a container index associated with that CEG object. However, if a matching fingerprint is found in a searched container index, it may be determined that a data unit identical to the received data unit is already stored in an existing CEG object. In response to this determination, the reference count of the corresponding entry may be incremented, and the received data unit is not stored in a CEG object (as it is already present in the existing CEG object), thereby avoiding storing a duplicate data unit in the storage system.

In some examples, a deduplication storage system may store CEG objects and associated metadata objects in a remote storage (e.g., a "cloud" or network storage service), rather than in a local filesystem. In such examples, processing a read request for a stored data unit may include loading the appropriate manifest from remote storage into memory, reading the manifest to identify the appropriate container index, loading the container index from remote storage into memory, reading the container index to determine the location in a CEG object that stores the data unit, and then loading the CEG object from the remote storage into memory.

In some examples, a CEG object may become corrupted (e.g., due to a software or system error occurring when the CEG object is being written to remote storage), thereby preventing the proper storage of data units in that CEG object. Further, if the data units in a received backup item are matched (e.g., during data ingest) to the corrupt CEG object, those data units will appear to be stored in deduplicated form, but will not actually be stored in the corrupt CEG object. In this manner, a corrupt CEG object can cause an undetected data loss (also referred to as "silent corruption") that affects multiple backup items. In some examples, the corrupt CEG objects could be detected by performing a scanning process to validate the content of stored CEG objects. However, performing such a scanning process may be difficult and time consuming. For example, the scanning process may involve identifying the stored CEG objects, loading the identified CEG objects from remote storage into memory, and validating the data units stored in the identified CEG objects. Further, upon detecting a corrupt CEG object, it may be difficult or impractical to retrieve the correct data units (e.g., from an external data source) to repair or rebuild the corrupt CEG object.

In accordance with some implementations of the present disclosure, a controller of a deduplication storage system may receive a data stream (e.g., during a backup process), and may match a received data unit to a stored CEG object (e.g., during a data ingest of a backup item). Further, in response to matching the data unit to the stored CEG object, the controller may perform a validation process to determine whether that stored CEG object includes valid data. In some implementations, the validation process may include reading a container index to determine whether the CEG object has been previously validated. If the container index indicates that the CEG object has not been previously validated, the controller may perform one or more content tests to determine whether the CEG object includes the correct data units. Further, if the content tests indicate that the CEG object does not include the correct data units, the controller may obtain a new copy of the matched data unit (e.g., from the received data stream), and may store the new copy of the data unit in a new CEG object (e.g., a pending CEG object that is populated with new data units). Further, the controller may update the container index to reference the new CEG object as storing the data unit, and to increment the reference count for the data unit. In this manner, multiple instances of the data unit that are stored in deduplicated form (e.g., recorded in multiple manifests) will then reference a valid copy of the data unit. Accordingly, some implementations may reduce or eliminate the data loss resulting from corrupt CEG objects, and may thereby improve the performance of the deduplication storage system. Various details of the disclosed technique are discussed below with reference to FIGS. 1-8.

Figure 2A:
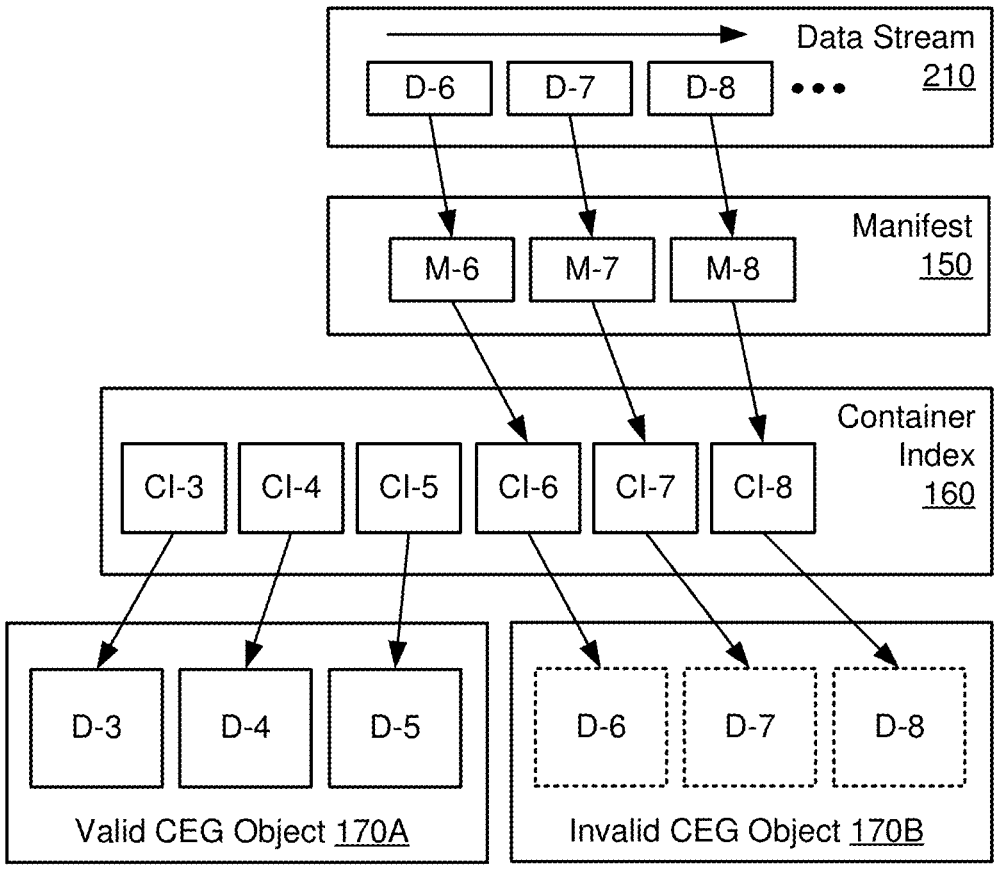
FIGS. 2A-2B are illustrations of example data structures, in accordance with some implementations.
Figure 2B:
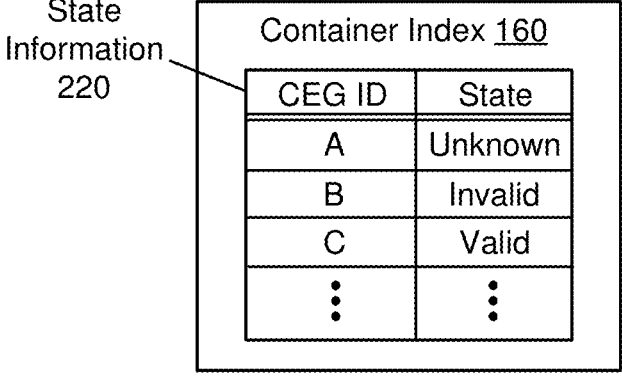

FIGS. 1-2B—Example Storage System

FIG. 1 shows an example of a system 105 that includes a storage system 100 and a remote storage 190. The storage system 100 may include a storage controller 110, memory 115, and persistent storage 140, in accordance with some implementations. The storage system 100 may be coupled to the remote storage 190 via a network connection. The remote storage 190 may be a network-based persistent storage facility or service (also referred to herein as "cloud-based storage"). In some examples, use of the remote storage 190 may incur financial charges that are based on the number of individual transfers.

The persistent storage 140 (also referred to herein as "local storage") may include one or more non-transitory storage media such as hard disk drives (HDDs), solid state drives (SSDs), optical disks, and so forth, or a combination thereof. The memory 115 may be implemented in semiconductor memory such as random access memory (RAM). In some examples, the storage controller 110 may be implemented via hardware (e.g., electronic circuitry) or a combination of hardware and programming (e.g., comprising at least one processor and instructions executable by the at least one processor and stored on at least one machine-readable storage medium).

As shown in FIG. 1, the memory 115 and the persistent storage 140 may store various data structures including at manifests 150 and container indexes 160. In some examples, copies of the manifests 150 and the container indexes 160 may be transferred between the memory 115 and the persistent storage 140 (e.g., via read and write input/output (I/O) operations). The remote storage 190 may persistently store container entity group ("CEG") objects 170. Each CEG object 170 may be a container data structure configured to store multiple data units.

In some implementations, the storage system 100 may perform deduplication of the stored data. For example, referring now to FIGS. 1 and 2A, the storage controller 110 may receive a data stream 210 from an external data source. In some implementations, the data stream 210 may include a sequence of data units (e.g., D-6, D-7, D-8) that are generated by the external data source (e.g., during a backup of a collection of data). In other implementations, the data stream 210 may additionally (or alternatively) include multiple fingerprints that represent the sequence of data units, and that are generated by the external data source (e.g., using a cryptographic hash function).

In some implementations, the storage controller 110 may generate a manifest 150 to record the order of the data units in the data stream 210. For example, the manifest 150 may include manifest records (e.g., M-6, M-7, M-8) that record the order of the data units (e.g., D-6, D-7, D-8). Further, the manifest 150 may include pointer(s) or other information indicating the container index 160 that includes metadata for the data units. For example, the container index 160 may include unit metadata CI-3, CI-4, CI-5 indicating that the data units D-3, D-4, D-5 are stored in a first CEG object 170A. Further, the container index 160 may include unit metadata CI-6, CI-7, CI-8 indicating that the data units D-6, D-7, D-8 are stored in a second CEG object 170B. Furthermore, the unit metadata may include fingerprints for the data units, reference counts that indicate the number of manifest locations that reference each data unit, compression information for the data units (e.g., whether compression was used, type of compression code, type of decompression code, decompressed size, a checksum value), and so forth.

In some implementations, the storage controller 110 may use the fingerprint of a received data unit to determine whether that data unit is a duplicate of a stored data unit. For example, the storage controller 110 may perform a matching operation to compare the fingerprint of an incoming data unit to the fingerprints stored in the container index 160. If a match is identified in the matching operation, the storage controller 110 may determine that a duplicate of the incoming data unit is already stored in the existing CEG object 170. The storage controller 110 may then store references to the previous data unit, instead of storing the duplicate incoming data unit. Otherwise, if no match is identified in the matching operation, the storage controller 110 may determine that the incoming data unit is a new data unit (i.e., is not already stored in the existing CEG objects 170). The storage controller 110 may then store a copy of the new data unit in a pending CEG object 175 loaded in the memory 115. As used herein, a "pending CEG object" may refer to a new CEG object that is generated in memory 115 to store new data units. Further, the storage controller 110 may store metadata regarding the new data unit in the container index 160. When the pending CEG object 175 is full (i.e., stores a maximum capacity of data units), the pending CEG object 175 may be written to the remote storage 190 (i.e., is stored as a CEG object 170), and a new pending CEG object 175 may be instantiated in the memory 115 to store any subsequent new data units.

In some implementations, if an incoming data unit is matched in a matching operation (i.e., indicating that a duplicate of the incoming data unit is already included in a stored CEG object 170), the storage controller 110 may perform a validation process to determine whether that stored CEG object 170 is valid (i.e., includes the correct data content). The validation process may include accessing the container index 160 to determine whether the stored CEG object 170 has been validated. For example, referring now to FIGS. 1 and 2B, the container index 160 may include state information 220 that indicates the validation states of associated CEG objects 170. As used herein, the "validation state" (also referred to as "CEG state") may indicate whether a CEG object 170 has been determined to include valid or invalid data. For example, the state information 220 may indicate that a CEG state is "Unknown" when the CEG object 170 has not been currently validated. Further, the state information 220 may indicate that a CEG state is "Valid" when the CEG object 170 has been determined to include valid data. Furthermore, the state information 220 may indicate that a CEG state is "Invalid" when the CEG object 170 has been determined to be corrupt (e.g., is missing some or all of the correct data content).

In some implementations, if the CEG state is "Unknown," the storage controller 110 may perform one or more content tests to determine whether the CEG object 170 includes the correct data units. For example, the storage controller 110 may load the CEG object 170 from the remote storage 190 into the memory 115, may decompress the data units stored in the CEG object 170, and may perform a checksum validation of the extracted data units. In another example, the storage controller 110 may determine whether the CEG object 170 exists. In yet another example, the storage controller 110 may determine whether the size of the CEG object 170 matches an expected size. Other content tests are possible.

In some implementations, if the content test(s) indicate that the CEG object 160 includes valid data, the storage controller 110 may change the CEG state to "Valid" for that CEG object 170 (e.g., in the state information 220), and may increment the reference count for the data unit in the container index 160. Otherwise, if the content test(s) indicate that the CEG object 160 does not include valid data, the storage controller 110 may change the CEG state to "Invalid" for that CEG object 170, and may obtain a new copy of the matched data unit (e.g., by reading from the received data stream, by sending a request to the data source, and so forth). Further, the storage controller 110 may store the new copy of the data unit in the pending CEG object 170, and may update the container index 160 to reference the pending CEG object 170 as the storage location of the data unit. In this manner, the deduplicated metadata references to the data unit may no longer point to the corrupt CEG object 170, and can therefore be used to access the backup items represented by one or more manifests 150. An example processes for data validation of CEG objects 170 is discussed below with reference to FIGS. 3-4F.

In some implementations, the storage controller 110 may receive a read request to access the stored data, and in response may access metadata one or more manifests 150 to determine the sequence of data units that made up the original data. The storage controller 110 may then use pointer data included in a manifest 150 to identify the container indexes 160 that index the data units. Further, the storage controller 110 may use information included in the identified container indexes 160 to determine the locations that store the data units (e.g., CEG object 170, entity, offsets, etc.), and may then read the data units from the determined locations.

Note that, while FIGS. 1-2B show examples, implementations are not limited in this regard. For example, it is contemplated that some or all of the manifests 150 and container indexes 160 may be stored in the remote storage 190. In another example, it is contemplated that some or all of the CEG objects 170 may be stored in the persistent storage 140. In yet another example, it is contemplated that the memory 115, persistent storage 140, and/or remote storage 190 may include other data objects or metadata. Further, it is contemplated that the storage system 100 may include additional devices and/or components, fewer components, different components, different arrangements, and so forth.

Figure 3:
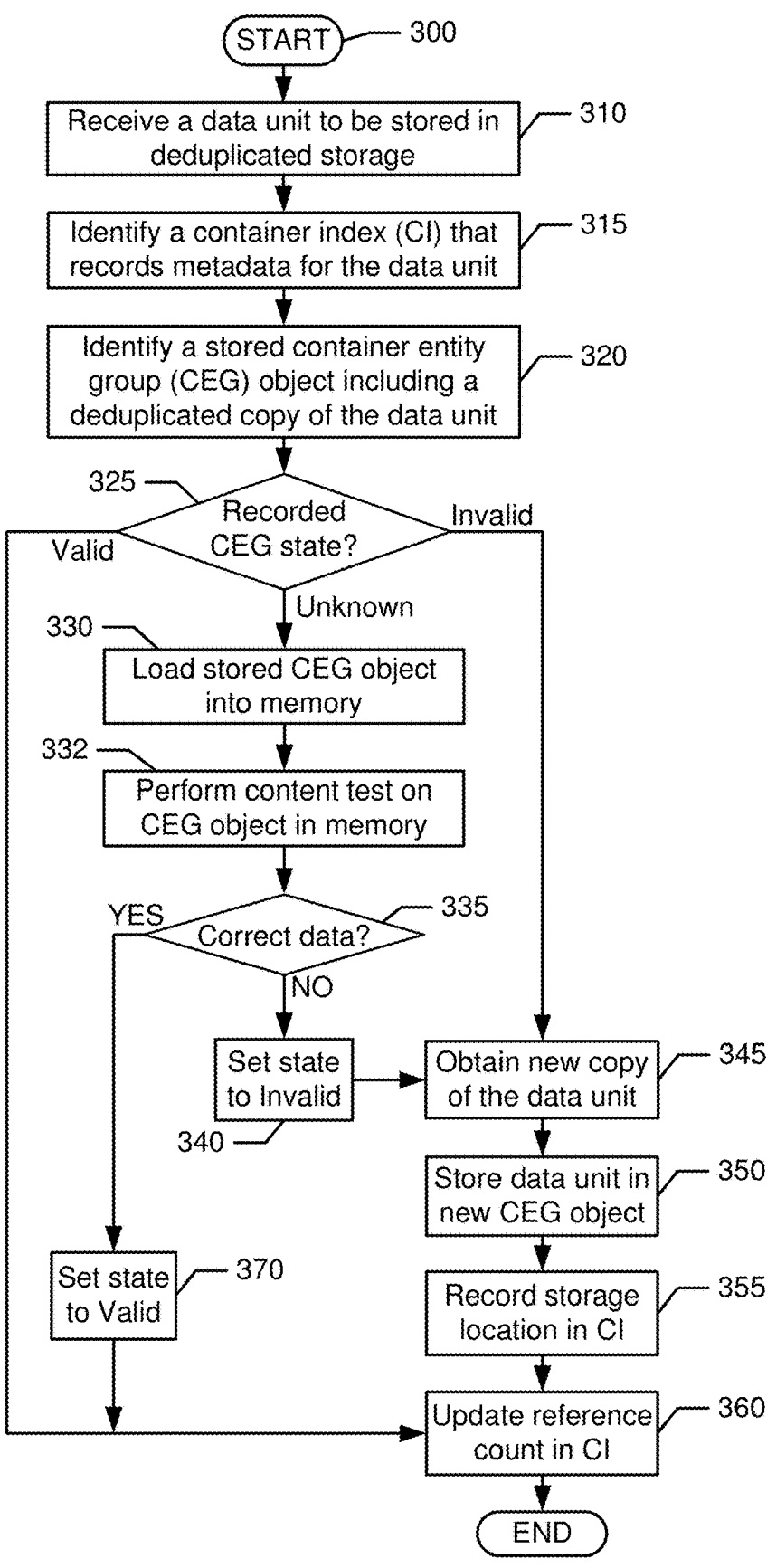
FIG. 3 is an illustration of an example process, in accordance with some implementations.
Figure 4A:
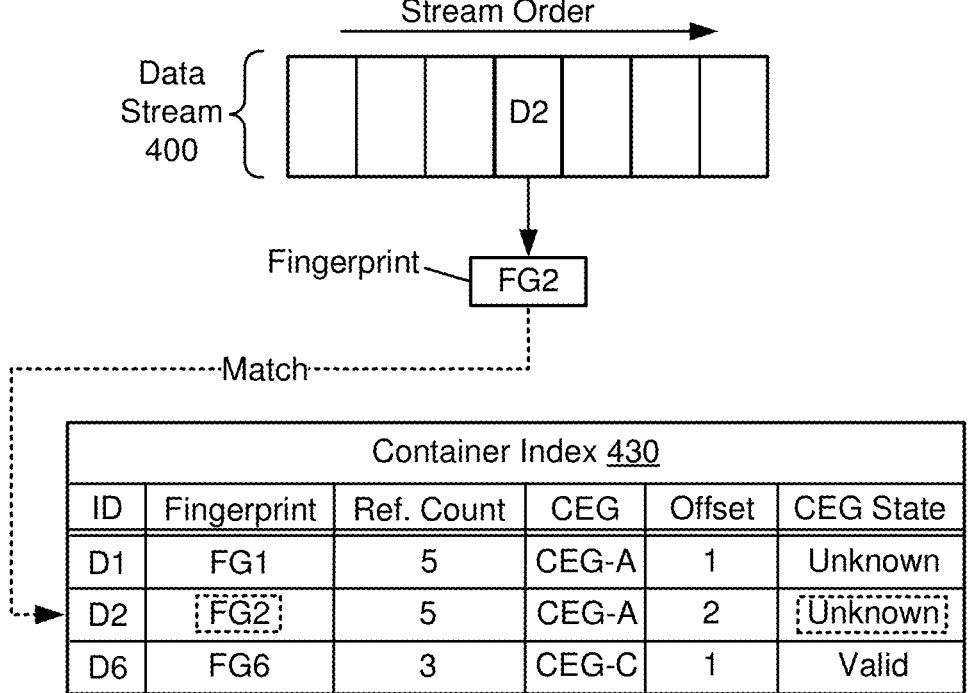
FIGS. 4A-4F are illustrations of example operations, in accordance with some implementations.
Figure 4B:
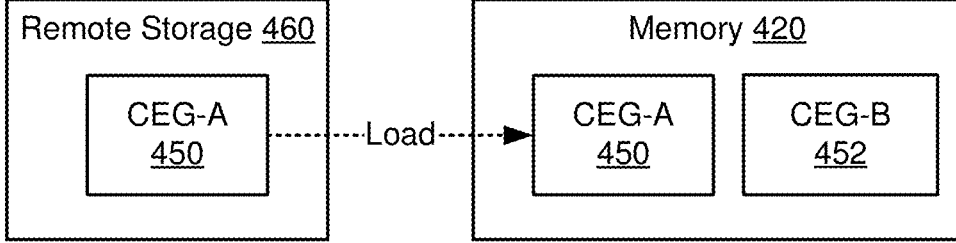
Figure 4C:
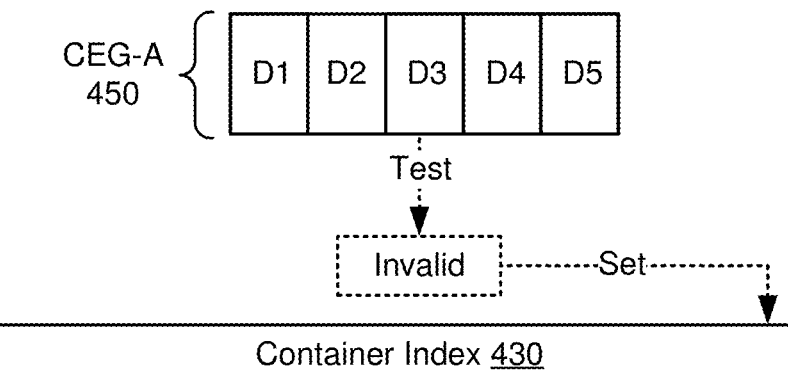
Figure 4D:
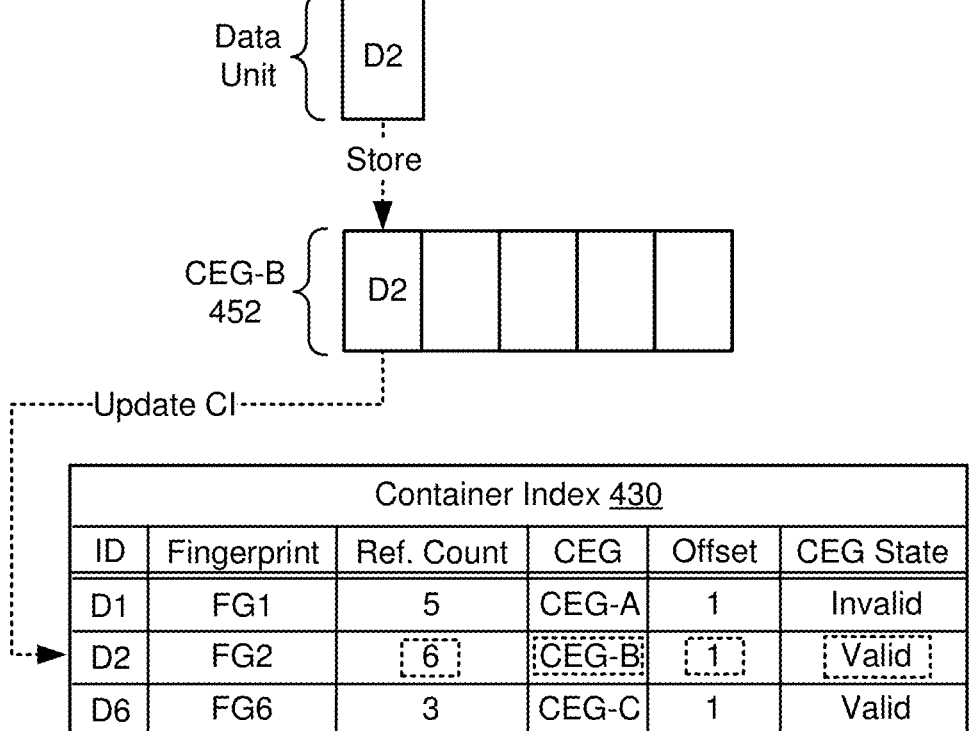
Figures 4E, 4F:
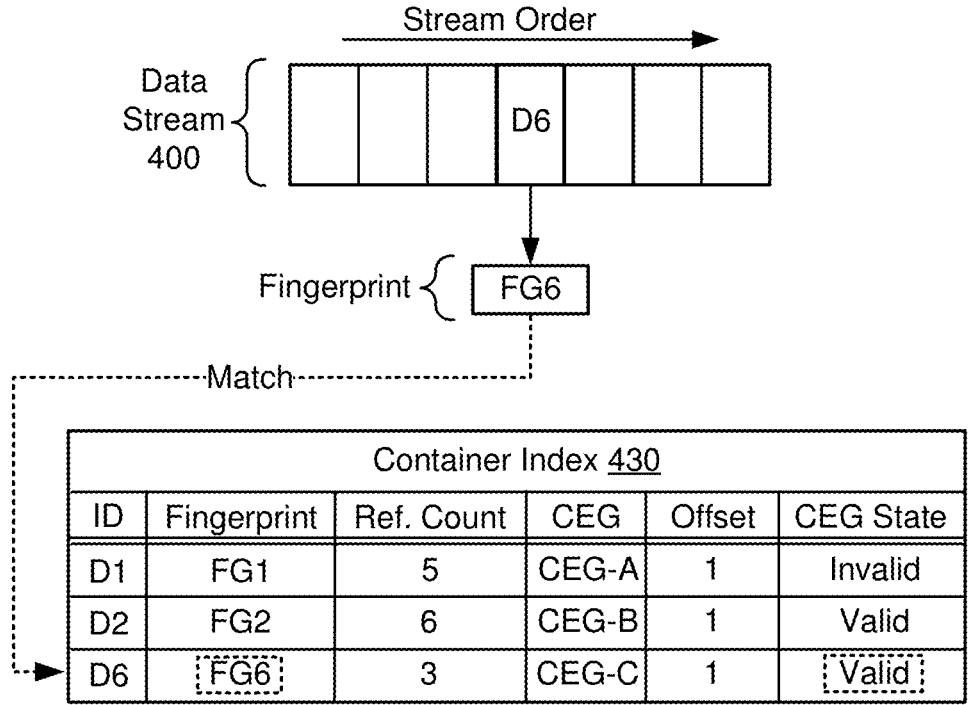

FIGS. 3-4F—Example Process for Data Validation

FIG. 3 shows an example process 300 for data validation, in accordance with some implementations. For the sake of illustration, details of the process 300 may be described below with reference to FIGS. 4A-4F, which show examples in accordance with some implementations. However, other implementations are also possible. In some examples, the process 300 may be performed using the storage controller 110 (shown in FIG. 1). The process 300 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth.

Block 310 may include receiving a data unit to be stored in deduplicated storage. Block 315 may include identifying a container index that records metadata for the received data unit. Block 320 may include identifying a stored container entity group (CEG) object that includes a deduplicated copy of the data unit. Decision block 325 may include determining the CEG state that is recorded for the stored CEG object.

For example, referring to FIG. 4A, a controller (e.g., storage controller 110 shown in FIG. 1) receives a data stream 400 to be stored in deduplicated form. The data stream 400 includes a sequence of data units, including the data unit D2. The controller obtains a fingerprint FG2 that represents the data unit D2. In some implementations, the fingerprint FG2 may be included in the data stream 400 (e.g., instead of, or in addition to, the data unit D2). In other implementations, the controller may generate the fingerprint FG2 by applying a hash function (e.g., a SHA-2 hash function) to some or all of the content of the data unit D2. The controller then performs a matching operation to compare the fingerprint FG2 to the fingerprints stored in a container index 430. Further, the controller determines that the fingerprint FG2 matches the fingerprint stored in a metadata entry (in container index 430) for the data unit D2, and thereby determines that a duplicate of the data unit D2 is already stored in an existing CEG object CEG-A. The controller then reads the metadata entry for the data unit D2 to determine the CEG state of the CEG object CEG-A that stores the data unit D2.

Referring again to FIG. 3, if it is determined at decision block 325 that the CEG state is recorded as "Unknown," the process 300 may continue at block 330, including loading the stored CEG object into memory. Block 332 may include performing one or more content tests on the CEG object in memory. Decision block 335 may include determining whether the CEG object includes correct data based on the one or more content tests. If it is determined at decision block 335 that the CEG object does not include the correct data ("NO"), the process 300 may continue at block 340, including setting the CEG state to "Invalid" for the stored CEG object.

For example, referring to FIG. 4A, the controller reads the metadata entry for the data unit D2 to determine that the CEG state is "Unknown," thereby indicating that the CEG object CEG-A has not been currently validated. In response to this determination, as shown in FIG. 4B, the controller causes the CEG object CEG-A to be loaded from the remote storage 460 into the memory 420. In some implementations, the memory 420 may also store a new CEG object CEG-B that is a pending CEG object (i.e., a CEG object that is instantiated in memory 420 to store new data units). Referring now to FIG. 4C, the controller performs one or more content tests on the CEG object CEG-A (loaded in memory 420), and thereby determines that the CEG object CEG-A does not include the correct data units. In response to this determination, the controller modifies the container index 430 to set the CEG state for CEG object CEG-A as "Invalid." In some implementations, the change to the CEG state may be recorded in each metadata entry that lists the CEG object CEG-A as the data unit location. For example, as shown in FIG. 4C, the CEG state is changed to "Invalid" in the metadata entries for data units D1 and D2.

Referring again to FIG. 3, after block 340, or if it is determined at decision block 325 that the CEG state is recorded as "Invalid," the process 300 may continue at block 345, including obtaining a new copy of the data unit. Block 350 may include storing new copy of the data unit in a new CEG object. Block 355 may include recording the storage location of the data unit in the container index. Block 360 may include updating a reference count for the data unit in the container index.

For example, referring to FIG. 4D, the controller obtains a new copy of the data unit D2 (e.g., by reading the data stream 400, by sending a data request to a remote data source, and so forth), and causes the data unit D2 to be stored in the new CEG object CEG-B. The controller then updates the storage location for the data unit D2 (in the D2 metadata entry of the container index 430). In some implementations, the storage location is recorded as a combination of a CEG identifier (e.g., "CEG-B") and an offset (e.g., "1"), where the CEG identifier indicates the CEG object that stores the data unit D2, and the offset indicates the offset location (in the CEG object) that stores the data unit D2. Further, the controller records the CEG state for the new CEG object CEG-B (in the D2 metadata entry of the container index 430) as "Valid." Furthermore, the controller increments the reference count for the data unit D2 (in the D2 metadata entry of the container index 430) by one. Note that, in the example shown in FIG. 4D, the incremented reference count is equal to six, thereby indicating that the single stored copy of the data unit D2 (in the CEG object CEG-B) is identified by six deduplicated references (e.g., is recorded in six manifest records). Note also that these six deduplicated references now point to a valid copy of the data unit D2, and therefore no longer point to the corrupt CEG object CEG-A.

Note that FIG. 4D illustrates the changes to the metadata entry for the data unit D2 that are performed in response to the receipt of the data unit D2. However, the metadata entry for data unit D1 is not modified in response to the receipt of the data unit D2. Accordingly, as shown in FIG. 4D, the metadata entry for data unit D1 continues to record the CEG identifier "CEG-A" and the CEG state "Invalid."

Referring again to FIG. 3, if it is determined at decision block 335 that the CEG object includes the correct data ("YES"), the process 300 may continue at block 370, including setting the CEG state to "Valid" for the stored CEG object. After block 370, or if it is determined at decision block 325 that the CEG state is recorded as "Valid," the process 300 may continue at block 360, including updating a reference count for the data unit in the container index. After block 360, the process 300 may be completed.

For example, referring to FIG. 4E, the controller obtains a fingerprint FG6 that represents a data unit D6 (e.g., in the data stream 400). The controller then performs a matching operation to compare the fingerprint FG6 to the fingerprints stored in a container index 430. Further, the controller determines that the fingerprint FG6 matches the fingerprint stored in a metadata entry (in container index 430) for the data unit D6, and thereby determines that a duplicate of the data unit D6 is already stored in an existing CEG object CEG-C. The controller then reads the metadata entry for the data unit D6 to determine that CEG state is "Valid," thereby indicating that the CEG-C has been previously validated. In response to this determination, as shown in FIG. 4F, the controller increments the reference count for the data unit D6 (in the D6 metadata entry of the container index 430) by one.

FIGS. 5A-5D—Example Processes for Setting Validation States

FIGS. 5A-5D show example processes for setting validation states, in accordance with some implementations. In some examples, these example processes may be performed using the storage controller 110 (shown in FIG. 1). These example processes may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth.

Figure 5A:
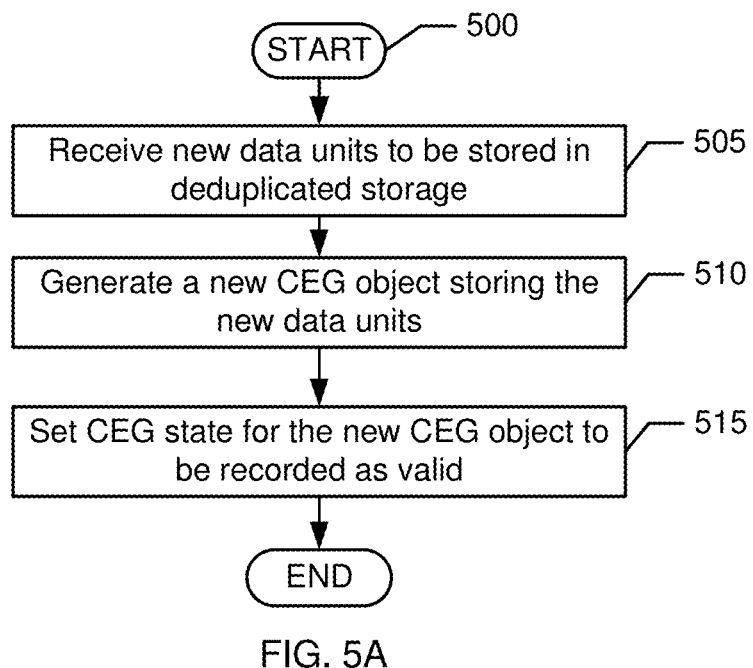
FIGS. 5A-5D are illustrations of example processes, in accordance with some implementations.

In some implementations, when a new container entity group (CEG) object is created (i.e., is instantiated and populated with new data units), a controller may set the validation state of that CEG object to valid to indicate that the CEG object includes the correct data units. For example, referring to FIG. 5A, shown is a process 500 for setting a validation state of a new CEG object (e.g., CEG-B 452 shown in FIG. 4D). Block 505 may include receiving new data units to be stored in deduplicated storage. Block 510 may include generating a new CEG object storing the new data units. Block 515 may include setting the CEG state for the new CEG object to be recorded as valid.

Figure 5B:
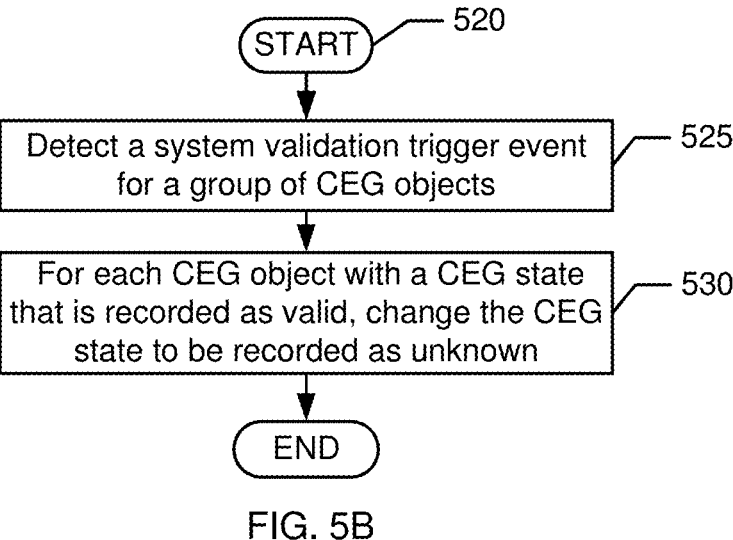

Referring now to FIG. 5B, shown is a process 520 for changing the validation states of a group of CEG objects in response to a system validation trigger event. Block 525 may include detecting a system validation trigger event for a group of CEG objects. Block 530 may include, for each CEG object, in the group of CEG objects, with a CEG state (i.e., validation state) that is recorded as valid, changing the CEG state to be recorded as unknown. In some examples, the system validation trigger event may be a hardware or software event that affects the data integrity for multiple CEG objects in a storage system (e.g., a storage device failure, an operating system crash, and so forth). Further, in other examples, the system validation trigger event may be a command (e.g., from a human user) to re-validate all CEG objects in a storage system that were previously set to a "Valid" state. Other examples are possible.

Figure 5C:
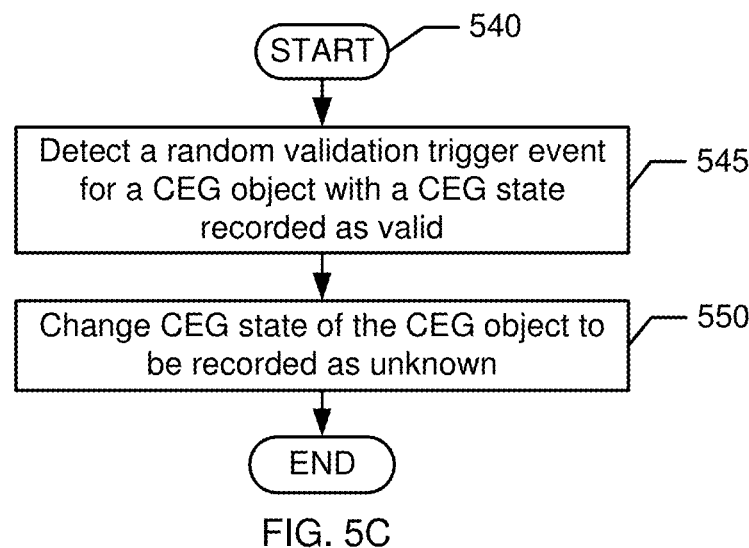

Referring now to FIG. 5C, shown is a process 540 for changing the validation state of a CEG object in response to a random validation trigger event. Block 545 may include detecting a random validation trigger event for a CEG object with a CEG state that is recorded as valid. Block 550 may include changing the CEG state of the CEG object to be recorded as unknown. In some implementations, the random validation trigger event may be a function that is randomly triggered with a specified average frequency (e.g., an average of once per day).

Figure 5D:
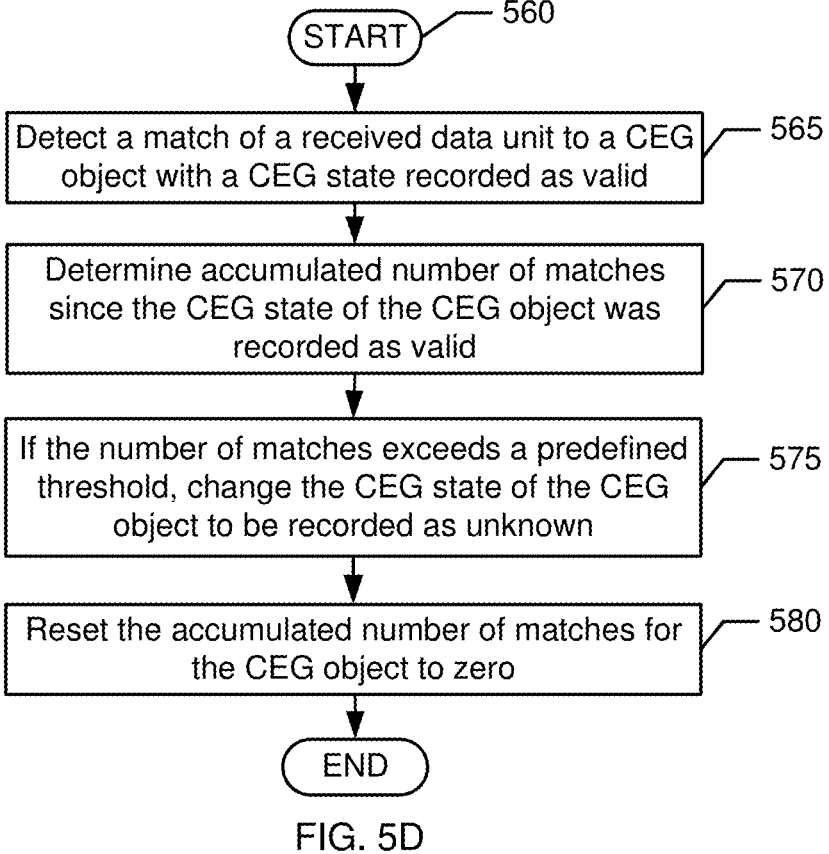

Referring now to FIG. 5D, shown is a process 560 for changing the validation state of a CEG object based on an accumulated number of matches for the CEG object (i.e., the number of times that a fingerprint of a received data unit matched a fingerprint of a data unit stored in the CEG object). Block 565 may include detecting a match of a received data unit to a CEG object with CEG state that is recorded as valid. Block 570 may include determining an accumulated number of matches since the CEG state of the CEG object was recorded as valid. Block 575 may include, if the accumulated number of matches exceeds a predefined threshold, changing the CEG state of the CEG object to be recorded as unknown. Block 580 may include resetting the accumulated number of matches for the CEG object to zero. In some implementations, the accumulated number of matches for the CEG object may be stored in a metadata field included in the CEG object. In other implementations, the accumulated number of matches of the CEG object may be stored in a metadata field included in a container index associated with the CEG object.

FIG. 6—Example Computing Device

FIG. 6 shows a schematic diagram of an example computing device 600. In some examples, the computing device 600 may correspond generally to some or all of the storage system 100 (shown in FIG. 1). As shown, the computing device 600 may include a hardware processor 602, a memory 604, and machine-readable storage 605 including instructions 610-650. The machine-readable storage 605 may be a non-transitory medium. The instructions 610-650 may be executed by the hardware processor 602, or by a processing engine included in hardware processor 602.

Instruction 610 may be executed to receive a data unit to be stored in a persistent storage of a deduplication storage system. Instruction 620 may be executed to identify a container index that includes metadata regarding the data unit. Instruction 630 may be executed to identify a first container entity group (CEG) object that is recorded, in the container index, as a deduplicated storage location of the data unit.

For example, referring to FIG. 4A, a controller (e.g., storage controller 110 shown in FIG. 1) receives a data stream 400 to be stored in deduplicated form. The data stream 400 includes a sequence of data units, including the data unit D2. The controller obtains a fingerprint FG2 that represents the data unit D2. The controller then performs a matching operation to compare the fingerprint FG2 to the fingerprints stored in a container index 430. Further, the controller determines that the fingerprint FG2 matches the fingerprint stored in a metadata entry (in container index 430) for the data unit D2, and thereby determines that a duplicate of the data unit D2 is already stored in an existing CEG object CEG-A. The controller then reads the metadata entry for the data unit D2 to determine the CEG state of the CEG object CEG-A that stores the data unit D2.

Instruction 640 may be executed to, in response to a determination that a validation state of the first CEG object is recorded as invalid in the container index, store the data unit in a second CEG object. Instruction 650 may be executed to modify the container index to record the second CEG object as the deduplicated storage location of the data unit.

For example, referring to FIG. 4C, the controller reads the metadata entry for the data unit D2 to determine that the CEG state is "Invalid," thereby indicating that the CEG object CEG-A has been determined to not include the correct data units. Referring now to FIG. 4D, in response to determining that the CEG state is "Invalid," the controller obtains a new copy of the data unit D2, and causes the data unit D2 to be stored in the new CEG object CEG-B. The controller then updates the storage location for the data unit D2 (in the D2 metadata entry of the container index 430). In some implementations, the storage location is recorded as a combination of a CEG identifier (e.g., "CEG-B") and an offset (e.g., "1"), where the CEG identifier indicates the CEG object that stores the data unit D2, and the offset indicates the offset location (in the CEG object) that stores the data unit D2. Further, the controller records the CEG state for the CEG object CEG-B (in the D2 metadata entry of the container index 430) as "Valid." Furthermore, the controller increments the reference count for the data unit D2 (in the D2 metadata entry of the container index 430) by one.

FIG. 7—Example Machine-Readable Storage Medium

FIG. 7 shows a machine-readable storage medium 700 including instructions 710-750, in accordance with some implementations. The instructions 710-750 can be executed by a single processor, multiple processors, a single processing engine, multiple processing engines, and so forth. The machine-readable medium 700 may be a non-transitory storage medium, such as an optical, semiconductor, or magnetic storage medium. The instructions 710-750 may correspond generally to the examples described above with reference to instructions 610-650 (shown in FIG. 6).

Instruction 710 may be executed to receive a data unit to be stored in a persistent storage of a deduplication storage system. Instruction 720 may be executed to identify a container index that includes metadata regarding the data unit. Instruction 730 may be executed to identify a first container entity group (CEG) object that is recorded, in the container index, as a deduplicated storage location of the data unit.

Instruction 740 may be executed to, in response to a determination that a validation state of the first CEG object is recorded as invalid in the container index, store the data unit in a second CEG object. Instruction 750 may be executed to modify the container index to record the second CEG object as the deduplicated storage location of the data unit.

Figure 8:
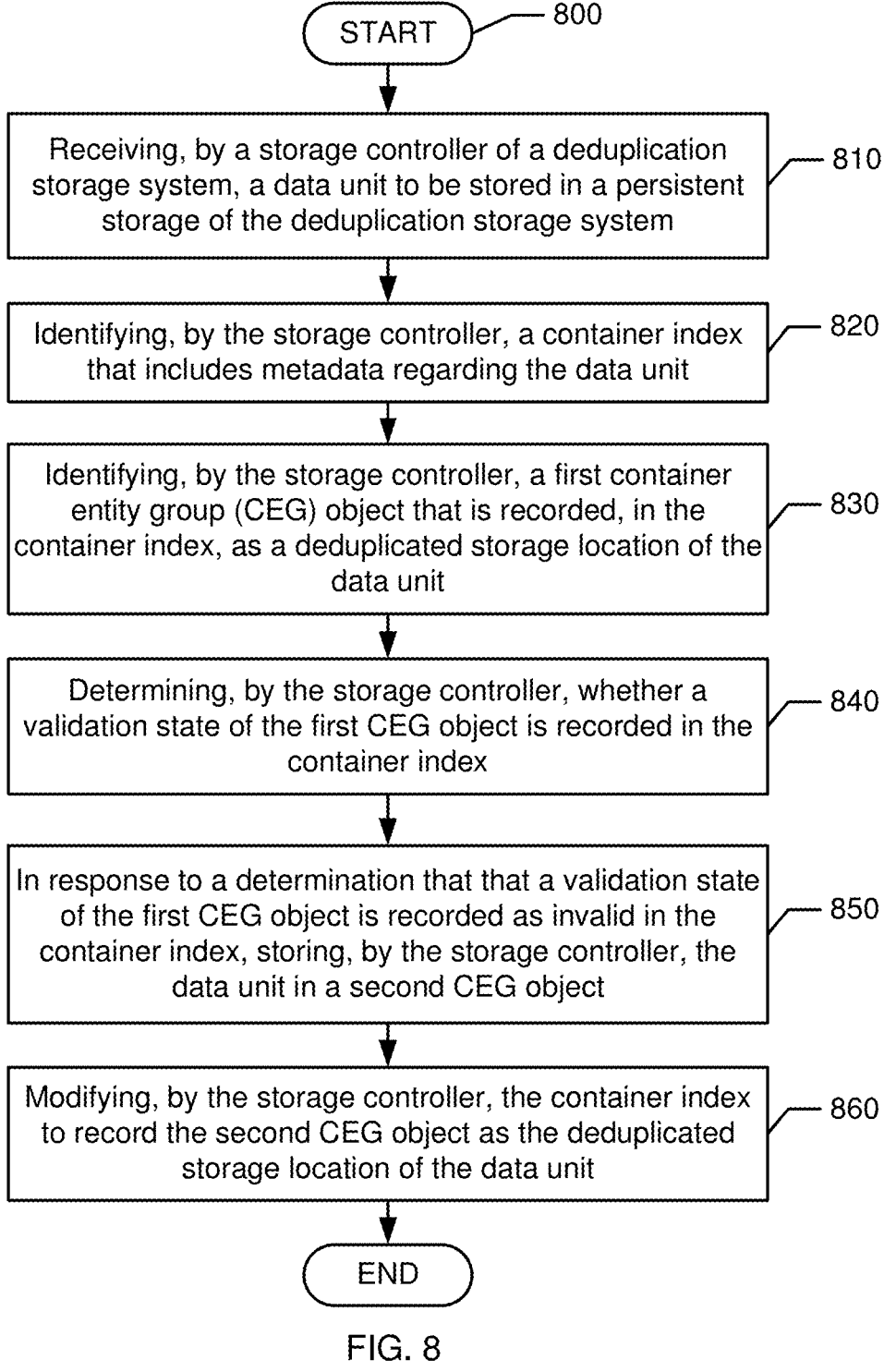
FIG. 8 is an illustration of an example process, in accordance with some implementations.

FIG. 8—Example Process for Data Validation

FIG. 8 shows an example process 800 for data validation, in accordance with some implementations. In some examples, the process 800 may be performed using the storage controller 110 (shown in FIG. 1A). The process 800 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth.

Block 810 may include receiving, by a storage controller of a deduplication storage system, a data unit to be stored in a persistent storage of the deduplication storage system. Block 820 may include identifying, by the storage controller, a container index that includes metadata regarding the data unit. Block 830 may include identifying, by the storage controller, a first container entity group (CEG) object that is recorded, in the container index, as a deduplicated storage location of the data unit.

Block 840 may include determining, by the storage controller, whether a validation state of the first CEG object is recorded in the container index. Block 850 may include, in response to a determination that a validation state of the first CEG object is recorded as invalid in the container index, storing, by the storage controller, the data unit in a second CEG object. Block 860 may include modifying, by the storage controller, the container index to record the second CEG object as the deduplicated storage location of the data unit. Blocks 810-860 may correspond generally to the examples described above with reference to instructions 610-650 (shown in FIG. 6).

CONCLUSION

In accordance with some implementations of the present disclosure, a controller of a storage system may receive a data stream, and may match a received data unit to a stored container entity group (CEG) object. Further, in response to matching the data unit to the stored CEG object, the controller may perform a validation process to determine whether that stored CEG object includes valid data. In some implementations, the validation process may include reading a container index to determine whether the CEG object has been previously validated. If the container index indicates that the CEG object has not been previously validated, the controller may perform one or more content tests to determine whether the CEG object includes the correct data units. Further, if the content tests indicate that the CEG object does not include the correct data units, the controller may obtain a new copy of the matched data unit, and may store the new copy of the data unit in a new CEG object. Further, the controller may update the container index to reference the new CEG object as storing the data unit, and to increment the reference count for the data unit. In this manner, multiple instances of the data unit that are stored in deduplicated form will now reference a valid copy of the data unit. Accordingly, some implementations may reduce or eliminate the data loss resulting from corrupt CEG objects, and may thereby improve the performance of the deduplication storage system.

Note that, while FIGS. 1-8 show various examples, implementations are not limited in this regard. For example, referring to FIG. 1, it is contemplated that the storage system 100 may include additional devices and/or components, fewer components, different components, different arrangements, and so forth. In another example, it is contemplated that the functionality of the storage controller 110 described above may be included in any another engine or software of storage system 100. Other combinations and/or variations are also possible.

Data and instructions are stored in respective storage devices, which are implemented as one or multiple computer-readable or machine-readable storage media. The storage media include different forms of non-transitory memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices.

Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A computing device comprising:
at least one processor;
a memory; and
at least one machine-readable storage medium comprising instructions executable by the at least one processor to:
receive a data unit to be stored in a persistent storage of a deduplication storage system;
identify a container index that includes metadata regarding the data unit;
identify a first container entity group (CEG) object that is recorded, in the container index, as a deduplicated storage location of the data unit;
in response to a determination that a validation state of the first CEG object is recorded as invalid in the container index, store the data unit in a second CEG object; and
modify the container index to record the second CEG object as the deduplicated storage location of the data unit.

2. The computing device of claim 1, including instructions executable by the at least one processor to, in response to the determination that the validation state of the first CEG object is recorded as invalid in the container index:
increment, in the container index, a reference count for the data unit.

3. The computing device of claim 2, including instructions executable by the at least one processor to, in response to a determination that the validation state of the first CEG object is recorded as unknown in the container index:
load the first CEG object from a remote storage into the memory;
perform one or more content test on the first CEG object loaded in the memory; and
determine whether the first CEG object includes correct data based on the one or more content tests.

4. The computing device of claim 3, including instructions executable by the at least one processor to, in response to a determination that the first CEG object includes the correct data based on the one or more content tests:
record the validation state of the first CEG object as valid in the container index; and
increment, in the container index, the reference count for the data unit.

5. The computing device of claim 3, including instructions executable by the at least one processor to, in response to a determination that the first CEG object does not include the correct data based on the one or more content tests:
record the validation state of the first CEG object as invalid in the container index;
store the data unit in the second CEG object;
modify the container index to record the second CEG object as the deduplicated storage location of the data unit; and
increment, in the container index, the reference count for the data unit.

6. The computing device of claim 1, including instructions executable by the at least one processor to:
detect a system validation trigger event for a group of CEG objects stored in the persistent storage of the deduplication storage system; and
in response to a detection of the system validation trigger event, for each of the group of CEG objects that has a validation state recorded as valid, change the validation state to be recorded as unknown.

7. The computing device of claim 1, including instructions executable by the at least one processor to:
detect a random validation trigger event for a third CEG object with a validation state that is recorded as valid; and
in response to a detection of the random validation trigger event, change the validation state of the third CEG object to be recorded as unknown.

8. The computing device of claim 1, including instructions executable by the at least one processor to:
detect a match of a received data unit to a fourth CEG object with a validation state that is recorded as valid;
in response to a detection of the match of the received data unit to the fourth CEG object, determine an accumulated number of matches since the validation state of the fourth CEG object was recorded as valid;
in response to a determination that the accumulated number of matches exceeds a predefined threshold, change the validation state of the fourth CEG object to be recorded as unknown; and
reset the accumulated number of matches for the fourth CEG object to zero.

9. A method comprising:
receiving, by a storage controller of a deduplication storage system, a data unit to be stored in a persistent storage of the deduplication storage system;
identifying, by the storage controller, a container index that includes metadata regarding the data unit;
identifying, by the storage controller, a first container entity group (CEG) object that is recorded, in the container index, as a deduplicated storage location of the data unit;
determining, by the storage controller, whether a validation state of the first CEG object is recorded in the container index;
in response to a determination that that a validation state of the first CEG object is recorded as invalid in the container index, storing, by the storage controller, the data unit in a second CEG object; and
modifying, by the storage controller, the container index to record the second CEG object as the deduplicated storage location of the data unit.

10. The method of claim 9, comprising, in response to the determination that the validation state of the first CEG object is recorded as invalid in the container index:
incrementing, in the container index, a reference count for the data unit.

11. The method of claim 10, comprising, in response to a determination that the validation state of the first CEG object is recorded as unknown in the container index:
loading the first CEG object from a remote storage into the memory;
performing one or more content test on the first CEG object loaded in the memory; and
determining whether the first CEG object includes correct data based on the one or more content tests.

12. The method of claim 11, comprising, in response to a determination that the first CEG object includes the correct data based on the one or more content tests:

recording the validation state of the first CEG object as valid in the container index; and incrementing, in the container index, the reference count for the data unit.

13. The method of claim 11, comprising, in response to a determination that the first CEG object does not include the correct data based on the one or more content tests:

recording the validation state of the first CEG object as invalid in the container index;

storing the data unit in the second CEG object;

modifying the container index to record the second CEG object as the deduplicated storage location of the data unit; and incrementing, in the container index, the reference count for the data unit.

14. The method of claim 9, comprising:

detecting a system validation trigger event for a group of CEG objects stored in the persistent storage of the deduplication storage system; and in response to detecting the system validation trigger event, for each of the group of CEG objects that has a validation state recorded as valid, changing the validation state to be recorded as unknown.

15. A non-transitory machine-readable storage medium comprising instructions executable by at least one processor to:

receive a data unit to be stored in a persistent storage of a deduplication storage system;

identify a container index that includes metadata regarding the data unit;

identify a first container entity group (CEG) object that is recorded, in the container index, as a deduplicated storage location of the data unit;

in response to a determination that a validation state of the first CEG object is recorded as invalid in the container index, store the data unit in a second CEG object; and modify the container index to record the second CEG object as the deduplicated storage location of the data unit.

16. The non-transitory machine-readable medium of claim 15, including instructions executable by the at least one processor to, in response to the determination that the validation state of the first CEG object is recorded as invalid in the container index:

increment, in the container index, a reference count for the data unit.

17. The non-transitory machine-readable medium of claim 16, including instructions executable by the at least one processor to, in response to a determination that the validation state of the first CEG object is recorded as unknown in the container index:

load the first CEG object from a remote storage into the memory;

perform one or more content test on the first CEG object loaded in the memory; and determine whether the first CEG object includes correct data based on the one or more content tests.

18. The non-transitory machine-readable medium of claim 17, including instructions executable by the at least one processor to, in response to a determination that the first CEG object includes the correct data based on the one or more content tests:

record the validation state of the first CEG object as valid in the container index; and increment, in the container index, the reference count for the data unit.

19. The non-transitory machine-readable medium of claim 17, including instructions executable by the at least one processor to, in response to a determination that the first CEG object does not include the correct data based on the one or more content tests:

record the validation state of the first CEG object as invalid in the container index;

store the data unit in the second CEG object;

modify the container index to record the second CEG object as the deduplicated storage location of the data unit; and increment, in the container index, the reference count for the data unit.

20. The non-transitory machine-readable medium of claim 15, including instructions executable by the at least one processor to:

detect a random validation trigger event for a third CEG object with a validation state that is recorded as valid; and in response to a detection of the random validation trigger event, change the validation state of the third CEG object to be recorded as unknown.

* * * * *